United States Patent
Laurenson et al.

(10) Patent No.: US 11,451,263 B2
(45) Date of Patent: Sep. 20, 2022

(54) UNCONNECTED PAIRED PLATE CAPACITIVE COUPLING FOR TOUCH DETECTION AND COMMUNICATION

(71) Applicant: ENPOINTE FENCING PTY LTD, Mulgrave (AU)

(72) Inventors: Callum Laurenson, Ferny Creek (AU); Tony Grubman, Bentleigh East (AU)

(73) Assignee: ENPOINTE FENCING PTY LTD, Mulgrave (AU)

( * ) Notice: Subject to any disclaimer, the term of this patent is extended or adjusted under 35 U.S.C. 154(b) by 255 days.

(21) Appl. No.: 16/621,651

(22) PCT Filed: Jun. 22, 2018

(86) PCT No.: PCT/AU2018/050623
§ 371 (c)(1),
(2) Date: Dec. 11, 2019

(87) PCT Pub. No.: WO2018/232464
PCT Pub. Date: Dec. 27, 2018

(65) Prior Publication Data
US 2021/0152217 A1    May 20, 2021

(30) Foreign Application Priority Data
Jun. 22, 2017   (AU) .............................. 2017902406

(51) Int. Cl.
*H04B 5/00* (2006.01)
*G06F 3/044* (2006.01)
*G06F 21/32* (2013.01)

(52) U.S. Cl.
CPC ........... *H04B 5/0012* (2013.01); *G06F 3/044* (2013.01); *G06F 21/32* (2013.01); *H04B 5/0043* (2013.01)

(58) Field of Classification Search
CPC .. H04B 5/0012; H04B 5/0031; H04B 5/0043; G06F 3/044; G06F 21/32; A63B 69/02; A63B 71/0605; A63B 2225/50
(Continued)

(56) References Cited

U.S. PATENT DOCUMENTS 5,006,952 A   4/1991  Thomas
9,358,443 B2  6/2016  Morehouse et al.
(Continued)

OTHER PUBLICATIONS

Funato, H et al., 'Analysis of transfer power of capacitive power transfer system', 2013 IFFF 10th International Conference on Power Electronics and Drive Systems (PEDS), Jun. 2013, pp. 1015-1020.
(Continued)

*Primary Examiner* — Eugene Yun
(74) *Attorney, Agent, or Firm* — Innovation Capital Law Group, LLP; Vic Lin

(57) ABSTRACT

There is provided herein circuitry and methods for applications including touch detection and, in embodiments, low rate communication such as for secure device authentication. The method uses a circuit having a first device having a first pair of unconnected plates and an edge source coupled therebetween. The circuit further comprises a second device having a second pair of respective unconnected plates and a charge sensor coupled therebetween. The method for touch detection comprises applying at least one differential edge between the first pair of unconnected plates using the edge source and detecting touch by coherently (i.e. in time) sensing an imbalance in a near field channel formed between the plates and an output signal of the charge sensor. The present method/circuit has various applications including for touch detection in fencing and secure device authentication employing both touch detection and bidirectional cryptographic communication between key and secure devices.

35 Claims, 7 Drawing Sheets

(58) Field of Classification Search
USPC .......................................................... 455/41.1
See application file for complete search history.

(56) References Cited

U.S. PATENT DOCUMENTS

| | | | |
|---|---|---|---|
| 10,497,107 B1* | 12/2019 | Lérant ........................ | G06T 5/20 |
| 2007/0076499 A1* | 4/2007 | Iwata ................. | G11C 16/0475 |
| | | | 365/208 |
| 2015/0137623 A1 | 5/2015 | Shirasaka | |
| 2016/0042216 A1* | 2/2016 | Yang ........................ | G06F 3/042 |
| | | | 382/124 |
| 2018/0144170 A1* | 5/2018 | Suwald .............. | G06V 40/1306 |

OTHER PUBLICATIONS

International Search Report dated Sep. 11, 2018 from corresponding PCT Application No. PCT/AU2018/050623.
Kline M., 'Capacitive Power Transfer', University of California Berkeley Department of Electrical Engineering and Computer Science, Dec. 2010, pp. 1-35.

* cited by examiner

UNCONNECTED PAIRED PLATE CAPACITIVE COUPLING FOR TOUCH DETECTION AND COMMUNICATION

FIELD OF THE INVENTION

This invention relates generally to touch detection and communication circuitry. More particularly, this invention relates to circuitry comprising unconnected paired plate capacitive coupling for applications including touch detection and, in embodiments, communication.

SUMMARY OF THE DISCLOSURE

There is provided herein circuitry and methods for applications including touch detection and, in embodiments, low rate communication such as for secure device authentication.

The method comprises employing a circuit having a first device having a first pair of unconnected plates and an edge source coupled therebetween. The circuit further comprises a second device having a second pair of respective unconnected plates and a charge sensor coupled therebetween.

The method for touch detection therefore comprises applying at least one differential edge between the first pair of unconnected plates using the edge source and detecting touch by coherently (i.e. in time) sensing an imbalance in a near field channel formed between the plates and an output signal of the charge sensor.

Out-of-band timing synchronisation may be used for coherency. Alternatively, in band signalling, such as waveform characteristic analysis may be used without an out-of-band channel.

The present circuit may also be used for communication wherein information is encoded within the at least one differential edge and decoded from the output signal of the charge sensor.

The present circuit has various applications including for touch detection in fencing.

Furthermore, the present circuit may be used for secure device authentication employing both touch detection and bidirectional cryptographic communication between key and secure devices.

According to one aspect there is provided a method for touch detection comprising: employing a circuit comprising: a first device having a first pair of unconnected plates and an edge source coupled therebetween; a second device having a second pair of respective unconnected plates and a charge sensor coupled therebetween, the method comprising: applying at least one differential edge between the first pair of unconnected plates using the edge source and; detecting touch by coherently sensing an imbalance in a near field channel formed between the plates using an output signal of the charge sensor.

The method may further comprise encoding information in the at least one differential edge and decoding the information using from the output signal.

The first device may be a low impedance (voltage source) transmitter.

The edge source may be controlled to transmit a sequence of differential edges.

The charge sensor may have a low input impedance

The charge sensor may comprise a transimpedance amplifier.

The charge sensor may comprise a regulated cascode transimpedance amplifier.

The charge sensor may comprise a resettable charge amplifier configured to integrate charge over a duration of a current pulse The output of the charge sensor may be operably coupled to an analogue-to-digital converter.

The output of the charge sensor may be sampled according to a transmission period of the at least one differential edge.

The method may further comprise transmitting timing information out-of-band and controlling sampling of the second device according to the timing information The second device may be configured to determine when to sample the output signal according to a signal characteristic of the output signal.

The method may further comprise measuring a current path direction between the second pair of plates to determine which plate of the second device may be more strongly coupled to a plate of the first device.

The circuit may further comprise: a further edge source coupled between the second pair of plates; and a further charge sensor coupled between the first pair of plates, the method comprising: applying at least one further differential edge between the second pair of unconnected plates using the further edge source and detecting touch by coherently detecting an imbalance in the near field channel formed between the plates using a further output signal of the further charge sensor.

The method may further comprise applying the at least one differential edge and the at least one further differential edge alternately.

The method may further comprise controlling the devices to time division multiplex the at least one differential edge and the at least one further differential edge.

The first device may have a further pair of unconnected plates and wherein the method may comprise applying at least one differential edge alternately between the first pair and the further pair.

The second device may have a further pair of unconnected plates and wherein the method may comprise receiving the output signal alternately from the second pair and the further pair.

The plates are shaped to shield parasitic capacitance between non-respective plates of the first and second pairs.

Processing gain may be used for the encoding and decoding.

The circuit may be used for touch detection for fencing.

The circuit may be placed close to a player body, and wherein plates comprise a weapon, a weapon tip, a lame, and a local pad, the local pad coupling to a player body.

An additional pad may be used for coupling a surrounding environment.

A player body may be coupled to a weapon grip and wherein plates comprise a weapon, a grip and a weapon tip.

The circuit may be housed within a guard of a weapon.

A signal may be transmitted via a piste for floor hit detection.

The circuit may be further used for secure device authentication.

The method may further comprise using the first device as a key device and the second device as a secure device and wherein:

one of the plates of the key device may be located closer to a body of a user, and another of the plates of the key device couples a surrounding environment; and one of the plates of the secure device may be located for touching by the body of the user for authorising the key device and another of the plates of the secure device couples the surrounding environment.

Both of the key and secure devices may comprise edge sources for transmitting and charge sensors for receiving and wherein the method may further comprise alternating the devices in turn between transmitting and receiving.

The method may further comprise measuring a round trip transmission propagation delay between the key and secure devices.

The method may further comprise authentication by transmitting a cryptographic challenge between the key and secure devices and receiving a response between the key and secure devices.

The method may further comprise shortening symbol time for distance bounding.

The method may further comprise using cryptographic processing gain for at least one of secure sensitivity improvement and secure noise immunity.

The method may further comprise capacitive sensing to determine which plate of the key device plates may be closest to a user's body to determine orientation of the key device.

The method may further comprise verifying direction of a dominant field path with respect to the orientation for preventing unauthorised access by proximal bodies.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

In embodiments that follow, there is provided a circuit having unconnected and capacitively coupled paired plates which may be used for touch detection, and, in embodiments, low speed communication.

Figure 1:
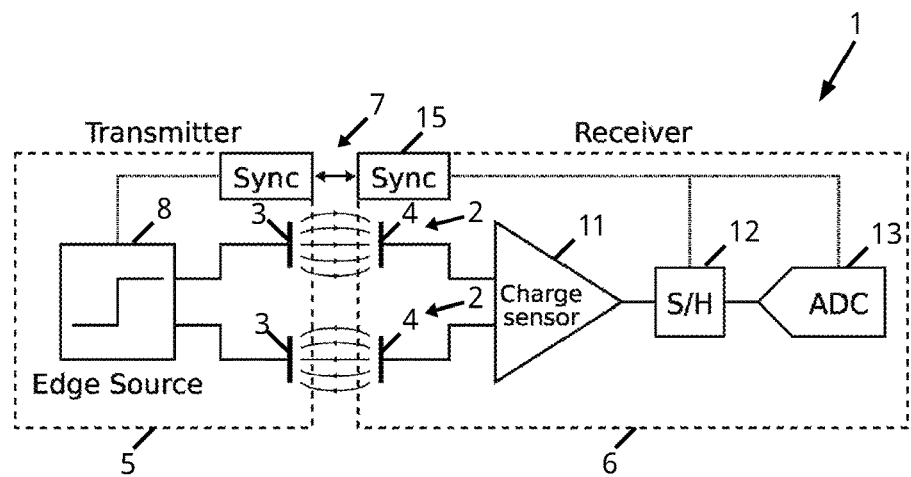
FIG. 1 shows a functional schematic of a touch detection circuit in accordance with an embodiment.

FIG. 1 shows an ultra-wideband/spread spectrum near field capacitive coupling detection/sensing circuit 1.

The circuit 1 senses changes in the capacitive coupling between two or more pairs of unconnected plates 2, where the plates 3 of the transmitter 5 generate an electric field 7, which is coupled onto the plates 4 of the receiver 6. Circuit 1 may be used for touch detection, communication, secure device authentication, et cetera.

Applications for the circuit 1 include over the body communications and touch detection such as, for example, detecting and identifying contact between humans, objects and the like.

The circuit comprises a pair of devices, which, for illustrative convenience, are described as being a transmitter 5 and a coherent receiver 6. However, it should be noted that in embodiments, including those described below, both devices may comprise edge sources and charge sensors so as to allow for bidirectional touch sensing/communication.

Pulse Train Transmitter

The output of the transmitter 5 may be low impedance (voltage source) which reduces or eliminates the effects of parasitic capacitances between the transmitting pair of plates 3. Such low impedance output provides current injection and timing consistency through the near field channel 7 when compared to traditional RF style resonator-based transmitters.

Figure 2A:
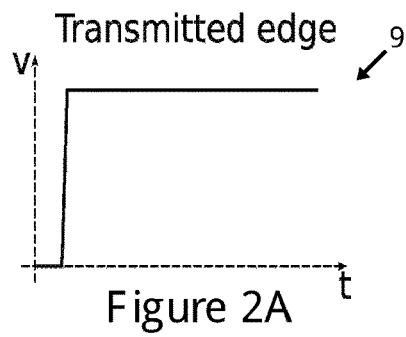
FIG. 2 shows exemplary applicable waveforms of the detection circuit in accordance with an embodiment.

The transmitter 5 comprises an edge source 8 operatively coupled to the transmitter pair of plates 3. The edge source 8 may transmit an edge 9 as is substantially shown by the waveform of FIG. 2A.

Figure 2B:
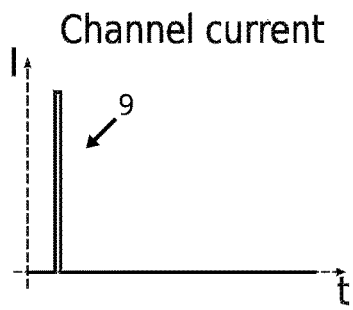

As a result, a current pulse 10 as is substantially provided in FIG. 2B is transmitted through the near field (capacitive) channel 7. As such, the edge source 8 may generate a current pulse train at a pulse rate through the channel 7. The edge source 8 may be a positive or negative edge source, and may change polarity for some edges.

The current pulses 10 can have a much higher bandwidth than the pulse rate. In embodiments, slew rate filtering, utilisation of Electromagnetic interference (EMI) filters or the like may be utilised to limit the bandwidth of the current pulses 10 so as to limit EMI, so as to, for example, meet FCC, CE electromagnetic compatibility standards and the like.

In embodiments, processing gain such as Direct Sequence Spread Spectrum (DSSS) modulation may be utilised to reject narrowband interference/noise.

In embodiments, capacitance and/or capacitive ratios between locally connected plates can be measured to estimate signal attenuation caused by mid-channel capacitive dividers. Greater capacitive loading may indicate larger parasitics between pads, which may correlate in a predictable way with signal attenuation in particular applications. Ratios can be estimated, or alternatively measured, in cases where there are more than two local plates.

Figure 11:
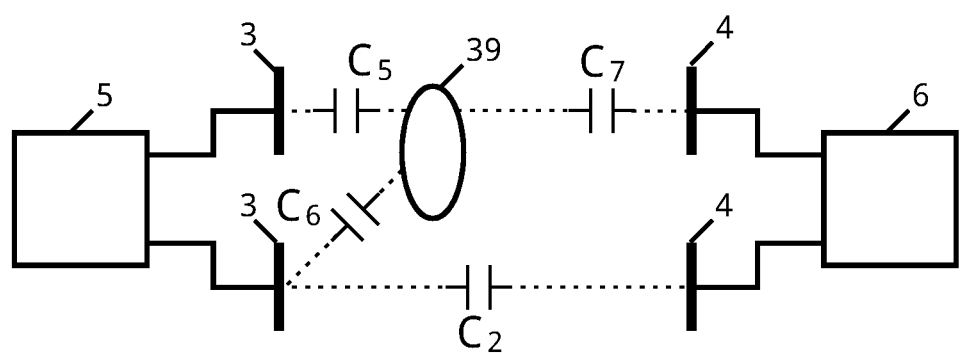
FIG. 11 illustrates mid-channel attenuation caused by a parasitic capacitive divider.

FIG. 11 shows a mid-path object 39 that causes attenuation of the signal in a path. The capacitive divider ratio between $C_5$ and $C_6$ determines the extent of this attenuation. By estimating this ratio, this effect can be mitigated.

For example, in embodiments, the transmitter 5 may adjust its output to maintain a consistent signal level after a parasitic capacitive divider such as caused by mid-path object 39. For example, if the pad is close to the body (or other mid-path object) 39, the transmitter 7 may attenuate its signal to keep the signal transmitted from the body consistent. Alternatively, the receiver 6 may alter its sensitivity to compensate for this estimated attenuation.

Coherent Current Sensing Receiver

The circuit 1 further comprises a coherent current sensing receiver 6. When a touch occurs, there is a large change in the capacitive coupling across the channel 7 and hence the signal strength received at the receiver 6, allowing for touch detection despite the relatively small capacitance across the channel 7.

The receiver 6 comprises a charge sensor 11 operatively coupled across to the pair of input plates 4. In embodiments, the charge sensor 11 may take the form of a transimpedance amplifier. Such an arrangement provides a low impedance input which reduces signal variation from variable parasitic capacitance between the sensing plates 4.

Figure 3:
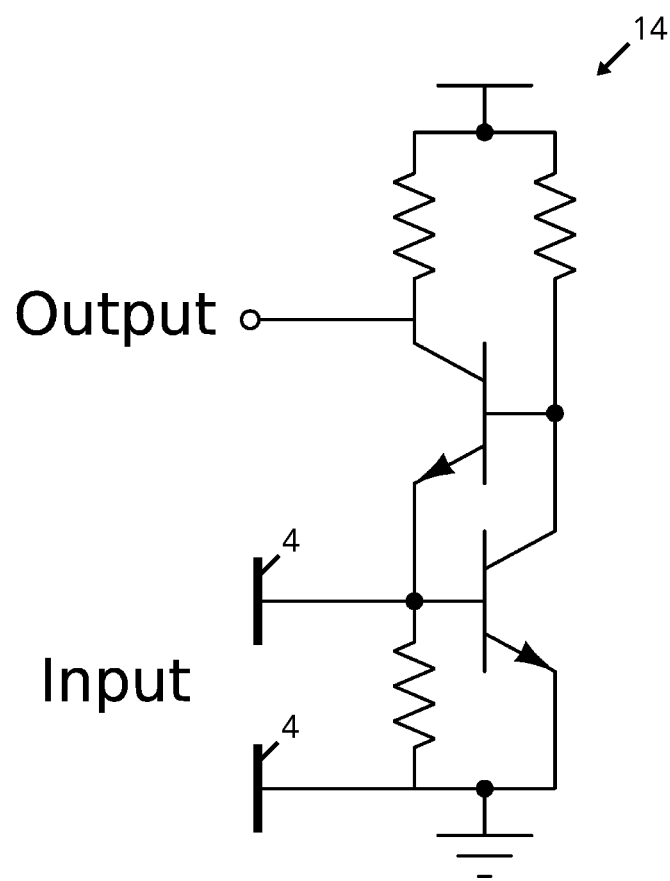
FIG. 3 shows a version of a charge sensing regulated cascode transimpedance amplifier in accordance with an embodiment.

FIG. 3 shows a regulated cascode transimpedance amplifier circuit 14 that may, in embodiments, be utilised as the charge sensor 11.

The charge sensor 11 generates a measurable signal 16 (as is substantially given in FIG. 2C) which is fed into a sample-and-hold/track-and-hold buffer 12 and analogue to digital converter (ADC) 13. The buffer 12 may be built into the ADC 13. Alternatively, the transimpedance amplifier 11 may be replaced with a resettable charge amplifier which integrates charge over the duration of a current pulse.

Processing gain may be achieved by integrating samples over time which, in embodiments, may be performed in analogue, allowing the utilisation of a slower ADC 13.

Transceivers

In embodiments, the transmitter/receiver devices 5, 6 may switch roles and alternate between transmitting and receiving. This enables bidirectional communication and touch detection.

If timing synchronisation is available, the transition between transmitter and receiver may be coordinated between devices to maximise channel utilisation.

In embodiments, such time division multiplexing allows for any number of devices to share the near field channel 7.

Out-of-Band Timing Synchronisation

Figure 2C:
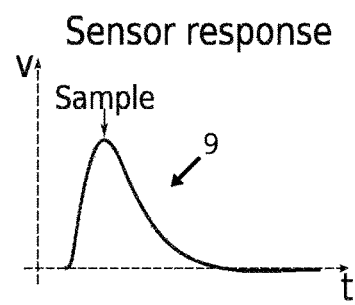

In embodiments, out-of-band timing synchronisation 15, using a different channel, such as, for example, an RF link, may be utilised for tight timing synchronisation to optimise the sampling time of the receiver 5, for example at a known point on the waveform, such as at the peak 16 given in FIG. 2C. This synchronisation may also be used to coordinate transmission/receiving mode transitions between the devices 5, 6.

Furthermore, synchronisation allows for a slower ADC which may, for example, implement one sample per pulse allowing for lower power consumption in that the ADC samples at the pulse rate of the spread spectrum signal.

In embodiments where more than two pairs of plates 2 exist or wherein when more than one pair 2 must transmit, the transmitter 5 may utilise time division multiplexing transmission either through interspersed single or multiple pulses or over longer periods and wherein some or all receivers 6 may operate simultaneously.

If only coarse timing is available out-of-band, approximate times can be used as an estimate for the location of a fixed point on the waveform, and a phase search can be performed, including as outlined below, in a narrow window around the expected time that the feature should appear.

In embodiments, this fixed point could be the peak of the waveform. In embodiments, this phase search may be performed using information gathered by high speed sampling, or alternatively, using equivalent time sampling.

For example, in an embodiment using equivalent time sampling, the transmitter 5 may send multiple pulses at fixed rate, while the receiver 6 slightly adjusts the receiver sample time to measure different points of the resulting waveform (i.e. sampling at a different phase for each pulse).

In an alternative embodiment using equivalent time sampling, the receiver 6 may measure at a fixed rate, while the transmitter slightly adjusts the transmitter edge output time over a number of pulses.

Figure 9:
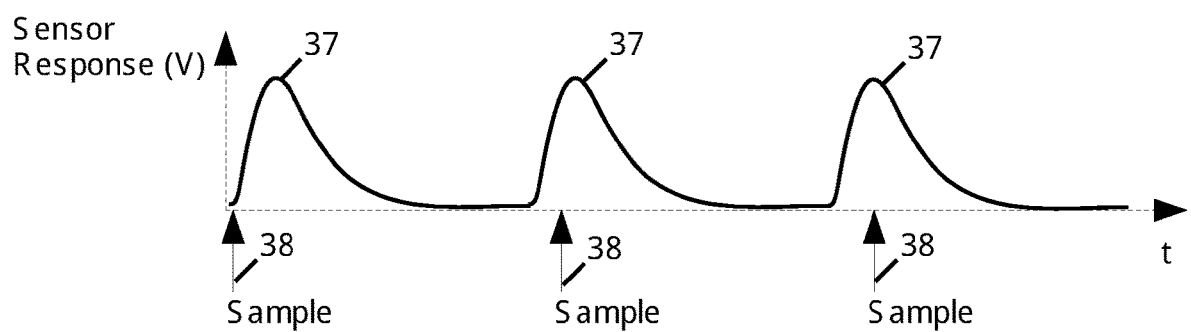
FIG. 9 shows an example of equivalent time sampling, which may be used to search for a fixed point on the waveform in accordance with an embodiment.

FIG. 9 shows the receiver's 6 response 37 when the transmitter 5 sends multiple pulses. The receiver 6 samples at various offsets 38 on the waveform to search for a fixed point on the waveform. The time adjustment may be performed at the transmitter 5 (allowing the receiver to keep its sample times consistent), or at the receiver 6 (allowing the transmitter to keep its output consistent).

Once the waveform position is known, synchronisation is established, and the receiver can use this timing information for many subsequent samples (up to the accuracy of its oscillator).

Without Out-of-Band Timing Synchronisation

In embodiments when out-of-band timing synchronisation is not available for transmission/receiving synchronisation, the transmitter/receiver devices may transmit and receive over an extended time period which guarantees some overlap of transmitting and receiving during that time period wherein, during this time period, each device may integrate the charge sensor 11 signal response across the time period to obtain a fixed signal strength independent of the frequency/phase drift between the transmitter/receiver devices.

To avoid situations of non-overlap, each transmitter/receiver device may have a differing transmission/reception period. For example, a transmitter/receiver device may alternate between transmitting and receiving with period T (transmit for T/2 and receive for T/2) and the other transmitter/receiver device may do the same with period 2T.

As such, a first of the devices 5, 6 may integrate over two receiving periods and the other device 5, 6 may integrate over one such period (both integrate for a total time of T). Regardless of the phase difference between the two devices, there is a fixed overlap of T/2 during the integration period when one of the devices is transmitting and the other device is receiving (and vice versa).

The received signal could be configured such that an inversion is not equivalent to (or even highly correlated with) a time shift (such as by having a duty cycle other than 50%) so as to allow for the detection of the signal direction.

Figure 10:
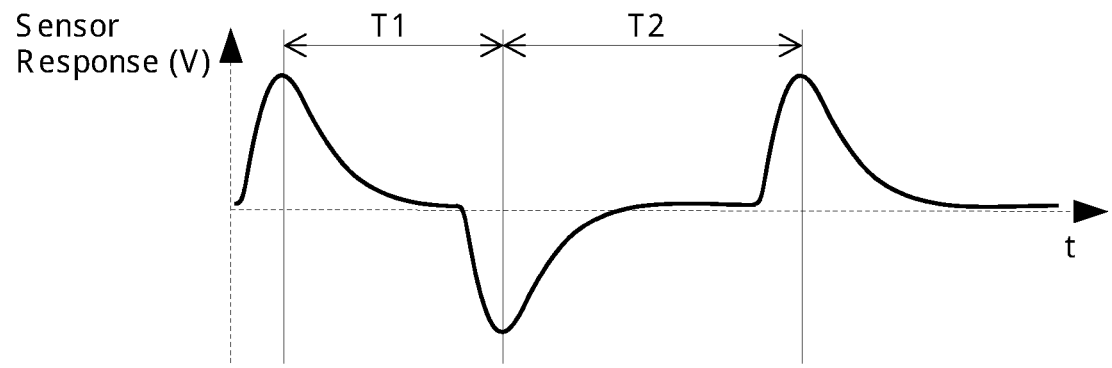
FIG. 10 illustrates polarity disambiguation in the absence of timing synchronisation in accordance with an embodiment.

For example, if the signal regularly alternates between positive and negative pulses (50% square wave), then a time shift of the signal resembles an inversion and therefore without the time synchronisation it may be difficult to determine if the received signal was positive or negative. Using, say, a 33% duty cycle, it is easy to determine the direction of pulses by comparing the timing of the positive and negative pulses. FIG. 10 shows that the time from positive to negative pulses T1 is shorter than the time from negative to positive T2. If the polarity were reversed, then T1 would be longer than T2, indicating the opposite polarity.

Alternatively, in-band synchronisation may be utilised, such as utilising a phase-locked loop (PLL), taking more samples per pulse and looking for the peak (both approaches still require an asymmetric signal) or the like.

In embodiments, in-band synchronisation could be achieved using high speed sampling, or alternatively, using equivalent time sampling, as explained above.

Alternatively, in-band communication could be used before timing synchronisation is acquired and used to set up out-of-band communication. For example, a pairing can be established for an out-of-band link using the communication techniques outlined above. Subsequent out-of-band timing could then be used to improve the performance of the in-band link.

In embodiments, synchronisation and data transfer may be performed simultaneously.

For example, an identification word may be used to establish a channel or unique address for the out-of-band communication.

As the transmitter 5 may not be able to detect if the receiver 6 is receiving or in range, the transmitter 5 may continuously or periodically repeat a message.

Without any prior synchronisation or time reference, the word boundary may need to be determined from the stream of bits.

The word boundary may be established using a unique synchronisation word or preamble.

Alternatively, if the transmitter 5 is repeating a message, the messages may be chosen from a set that allows unique identification without knowing the word boundaries.

For example, a Lyndon word is a unique canonical word among all its rotations. If all messages are chosen from the set of Lyndon words of length n (or a subset thereof), it may be unambiguously recovered by observing any n consecutive symbols.

In embodiments, the current pulses can be made wider (through reducing the slew rate of the voltage edge) to reduce the need for tight timing, In embodiments, out-of-band synchronisation could then subsequently be established and used in further touch detection and communication.

Pad Shielding and Geometry

In use, pads (having or being connected to the plates 3, 4) may be located and shaped such that the electric field is maximised over the desired sensing path.

Figure 4:
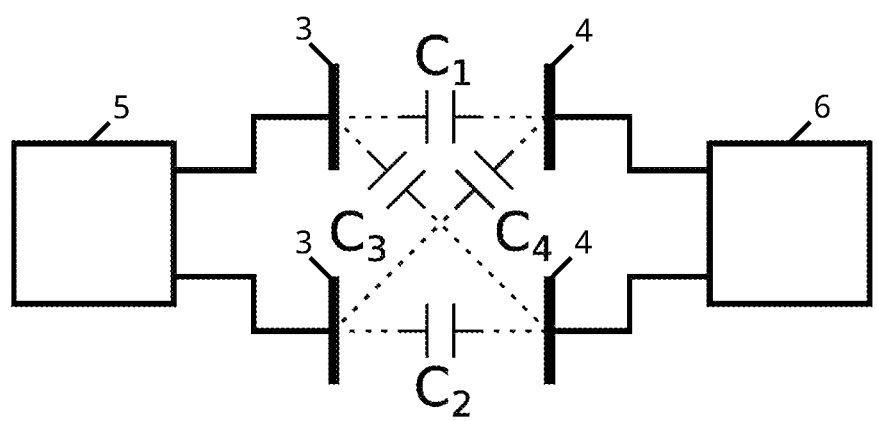
FIG. 4 illustrates capacitances between the plates of the near field channel between the transmitter and receiver of the detection circuit.

FIG. 4 shows various capacitances between the plates of plates 2 of the transmitter 5 and the receiver 6 wherein, as can be seen, capacitance paths C1 and C2 exists between each pair of plates 2 and parasitic capacitance paths C3 and C4 exist between non-paired plates.

Figure 5:
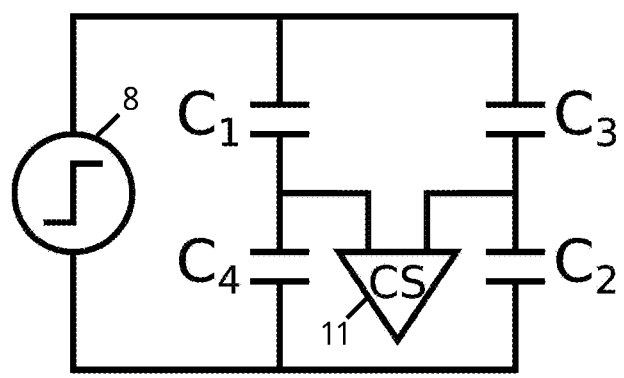
FIG. 5 shows a capacitive bridge illustration illustrating the capacitances between the plates of the near field channel in accordance with an embodiment.

Such capacitance paths are redrawn in FIG. 5 as a capacitive bridge showing the edge source 8, charge sensor 11 and the respective capacitance paths C1 and C2 and parasitic capacitance paths C3 and C4.

As such, the current sensor 11 is able to detect changes between capacitance paths of the bridge.

Figure 6:
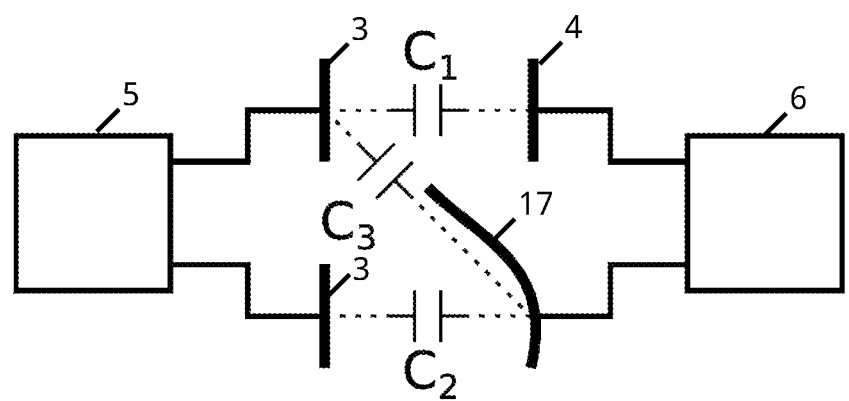
FIG. 6 shows the shaping of one of the pads/plates so as to provide shielding to negate parasitic capacitance between non-paired plates in accordance with an embodiment.

However, to negate the effects of parasitic capacitance paths C3 and C4, FIG. 6 shows an embodiment wherein one of the pads/plates is shaped so as to shield the effects of parasitic capacitance path C4 so as to, for example, ensure the charge flows through the sensor 11 only in one direction. For example, shielding could be used to prevent a return path outside the body (in a fencing application as described in further detail below).

A shield may be placed around one pad and connected to the other pad in order to control the electric field shape and path.

Additional Pads

In embodiments, more than two pads may be used in each device. As such, at any given time, pads may be combined by coupling them together, such that at any one time there are two effective pads. These pads can then be used for transmission or reception.

The combinations of pads may be altered at different times through time division multiplexing to gather additional information about the new capacitive paths formed.

Fencing Application

As alluded to above, the above circuit 1 as application for fencing to detect touches between weapons and on and off target areas. The circuit 1 is able to distinguish between such touches, even in situations where there is stronger coupling between plates due to sweat and large surface area.

In embodiments for the discipline of epee, up to four pads may be utilised in each device: the guard of the weapon, the tip of the weapon, a pad capacitively coupled to the fencer's body, and a pad coupled to the environment.

In embodiments for the discipline of foil, up to five pads may be utilised in each device: the guard of the weapon, the tip of the weapon, the lame (metal jacket), a pad capacitively coupled to the fencer's body, and a pad coupled to the environment.

In embodiments for the discipline of sabre, up to four pads may be utilised in each device: the weapon, the lame (metal jacket), a pad capacitively coupled to the fencer's body, and a pad coupled to the environment.

In embodiments, the circuit 1 may be configured to determine signal polarity to distinguish between a signal and its inverted form (either through timing synchronisation or using an asymmetric signal) to determine the direction of the path between the plate pairs.

This allows the determination of which transmitter plate is better coupled to a given receiver plate. In FIG. 1, if the two plates of the transmitter are reversed, the signal at the receiver is inverted. This functionally could correspond to distinguishing between a touch to the body of a fencer, and their target area.

In embodiments, the device may be located in a weapon to remove the need for body wire. In such embodiments, the grip of the weapon may be used to couple to the fencer's body, while the guard and tip of the weapon can be directly connected to the device. This arrangement is particularly suited to epee as there is no need for any additional pads. Such an arrangement may be similar for foil and sabre, but may require an additional device that connects to the lame with an additional pad coupled to the fencer's body.

Furthermore, instead of using the grip to couple to the body, one pad may be contained inside the guard of the weapon, and may shaped such that the pad couples to the hand but not directly to the environment or the opponent, thereby requiring less weapon alteration than decoupling the grip from the rest of the weapon.

Alternatively, body wiring may be used wherein a pocket module having an internal plate is connected by a body wire to the lame and blade (being the other plates).

In embodiments, the reverse side of pocket module may be shielded using another plate to prevent the electric field escaping and direct it rather towards the body to ensure signal direction is controlled on the body.

The capacitive divider ratio of the body-weapon to body-button capacitors could be measured by observing the response to an edge driven between button and weapon at the body plate. Hits to the piste can alter the body-button capacitance.

In embodiments, the transmitter may measure the capacitance and/or capacitive divider ratios between its plates to infer information about mid-channel attenuation, and communicate this information to the receiver.

In embodiments, the receiver may adjust its sensitivity based on information about mid-channel capacitance inferred from information gathered by the transmitter and/or receiver.

Piste Detection for Fencing

Fencing bouts are often conducted on a strip of metallic floor known as a piste. Hits to this piste should not register and so may require separate detection.

In embodiments, a separate device may be connected to the piste, and a signal could be asserted between the piste and a reference pad, which may be detected by the fencer's receiver when the weapon tip touches the piste.

Alternatively, a signal could be asserted between the weapon tip and the weapon blade or the fencer's body, which may be detected by a device connected to the piste (wherein the piste device has its own second plate and is a separate capacitive pair).

Alternatively, the capacitance between the tip and blade of the weapon could be measured. Hits to the piste can alter this capacitance.

Secure Device Authentication

In embodiments, the detection circuit 1 has application for secure device authentication based on touch (rather than on proximity so as to, for example, prevent unauthorised access in crowded environments, unlike proximity based smart keys and the like).

In this application, pad pairs comprise two pads on the key device (one close to the body and the other further away from the body). The key device could be in a pocket, or worn on the body, or held close to the body (for example a key fob, or ID card or credit card).

The other pair of plates 2 may be located on a door, computer mouse, point-of-sale device or other device to be secured.

Figure 7:
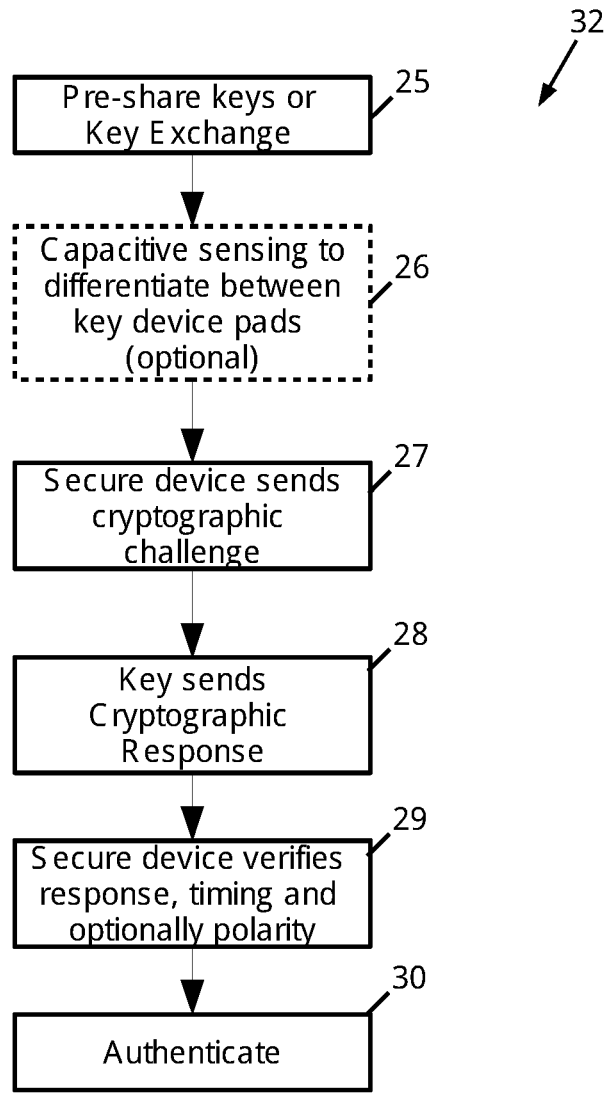
FIG. 7 shows a process for secure device authentication in accordance with an embodiment.
Figure 12:
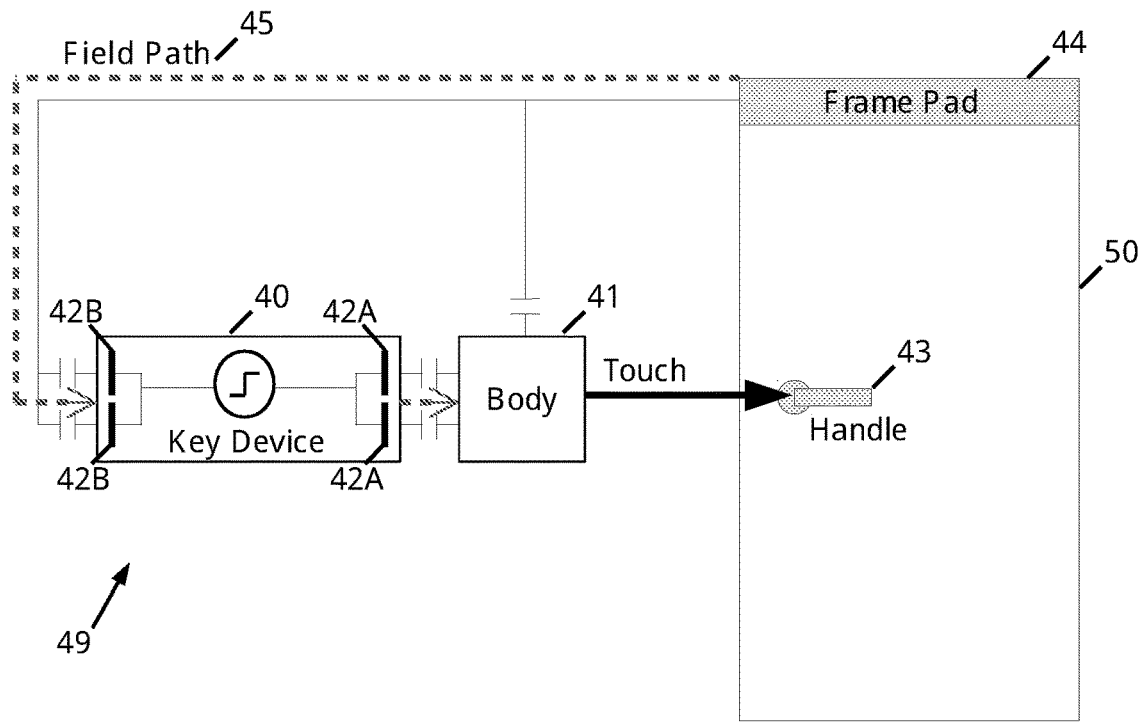
FIG. 12 shows the functional configuration of a secure device authentication embodiment.

FIG. 12 illustrates an exemplary system 49 comprising a secure key device 40 used for opening a secure door device 50, and FIG. 7 shows the corresponding secure device authentication process 32.

In embodiments, the key device may contain two pads 42, one of which is capacitively coupled to the body 41 of the key bearer.

The secure door device may also contain two pads, which may be connected to a handle 43 and an environmental coupling pad 44, respectively. In embodiments, the environmental coupling pad 44 may be embedded in the frame of the door/device to be secured 50.

In embodiments, the handle pad 43 may be any part of the door/device to be secured 50 that can be touched in order to authorise the key bearer 41.

In embodiments, each device 40, 50 may contain a memory device comprising pre-shared secret keys shared at step 25 of process 32. Alternatively, secret keys may be established via a key exchange process such as Diffie-Hellman.

When access to the secure device is attempted, the secure device may send a cryptographic challenge to the key device at step 27 of process 32. In embodiments, this may be communicated out of band. Alternatively, communication may be through the near field channel 45, in which case the key device 40 may act as the receiver and the secure device 50 as the transmitter.

At step 28 of process 32, the key device computes a cryptographic response to the challenge using its secret key. This response may be generated with a cryptographically secure pseudo-random number generator (CSPRNG). The response may be sent over the near field channel 45.

Upon receiving a response, the secure device 50 may verify that the response is valid and that it was received within an acceptable time window (at step 29 of process 32). If successful, the secure device 50 authenticates the key device 40 and grants access (at step 30 of process 32).

In embodiments, information transfer in the communication channel 45 of the response may be indicated by presence/absence of current pulses, or using positive and negative current pulses, or altering pulse timing, or varying pulse amplitude, or combinations thereof.

One pad of the key device 42A may be closer to the body 41 than the other pad 42B, resulting in a particular direction of the field path 45.

In embodiments, in order to ensure a consistent field path direction regardless of key device orientation, the key device 40 may determine its orientation relative to the body (at step 26 of process 32) and invert its transmitting direction as necessary.

In embodiments, the pads 42 of the key device 40 may each be split into two portions, so that the key device 40 may determine its orientation by measuring the capacitance between the portions of each pad. For example, if there is more capacitance between the two portions of 42A than the two portions of 42B, then the key device 40 may decide that 42A is closer to the body 41.

In embodiments, the secure device 50 may use the polarity information to verify that the key bearer 41, rather than an unauthorised person 46, is touching the handle 43.

Figure 13:
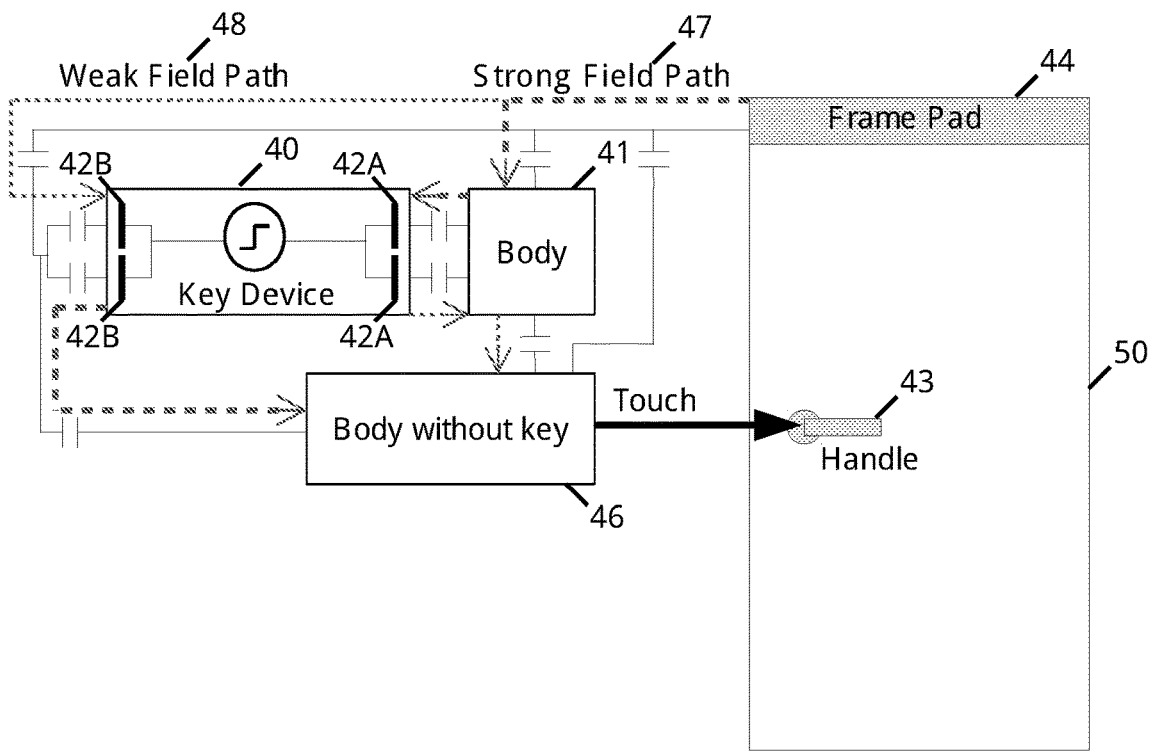
FIG. 13 illustrates the ability of an embodiment to distinguish between authorised and unauthorised bodies in close proximity.

FIG. 13 shows the possible capacitive paths when the key bearer 41 is close to the secure device 50 but is not touching the handle 43. When an unauthorised person 46 touches the handle, several capacitive paths may be formed, some of which pass through both the key device 40 and the secure device 50. The two paths of interest are the strong field path 47 and weak field path 48.

If path 47 is stronger than path 48, the signal received at the secure device 50 is inverted in polarity with respect to FIG. 12, where path 45 is the dominant direction of the field.

In embodiments, the secure device 50 may choose to reject authentication attempts at step 29 of process 32 if the polarity is incorrect. This may prevent unauthorised access in situations where the key bearer 41 is in proximity of the secure device 50 but not touching the handle 43.

In embodiments, to ensure that path 47 is stronger than path 48, the frame pad 44 may be positioned such that it is closer to the key bearer's body 41 than to the key device's environmental pad 42B.

In embodiments, this could be achieved by placing the frame pad 44 above or below the expected height of the key device (for example, the top or bottom of a door frame).

In embodiments, the frame pad 44 may be insulated from direct touch to ensure that the strong field path 47 cannot be compromised.

Optionally, the direction of the connection can be ignored by some embodiments, and the system becomes a proximity lock with distance bounding. In such embodiments, the secure device 50 may still grant access to the unauthorised person 46 when the strong field path 47 dominates the weak field path 48 and is sufficiently strong.

Ideally, cryptography alone is not enough and a need exists to protect against relay attacks. Utilisation of timing synchronisation accuracy (with low jitter) sets the allowable time a relay attacker has to detect, relay, and retransmit a challenge response. However, this is not enough to guarantee protection: if the symbol period is long (as in traditional over the body solutions), an attacker can determine the symbol early and transmit most of the symbol in time for the receiver to decode it correctly. Of more importance is the time from the start of the symbol transmission to the end of the symbol reception. Using narrow pulse transmission and a fast receiver, this time difference can be made very small.

In embodiments, time synchronisation may be achieved out of band like as outlined above. The reference time point may be the transmission of the challenge at step 27 of process 32, Alternatively, in-band timing measurement may be implemented by time division multiplexing transmission/reception on both sides. When the challenge 33 is transmitted, the secure device is the transmitter and the key device is the receiver. When the response 34 is transmitted, the key device is the transmitter and the secure device is the receiver.

Figure 8:
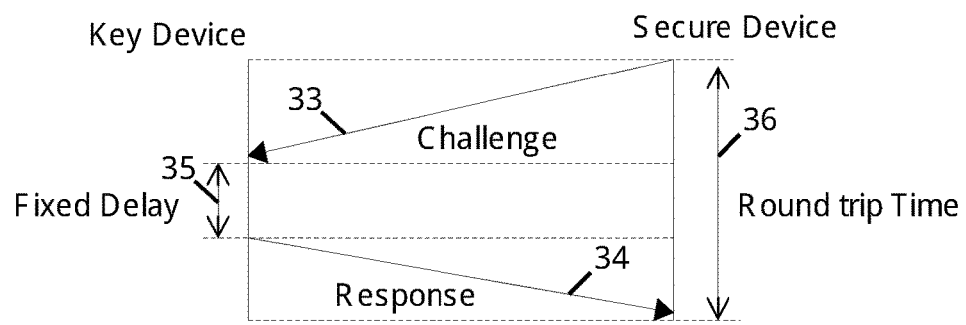
FIG. 8 shows a challenge/response exchange, where the round trip time is measured to estimate propagation delay in accordance with an embodiment.

FIG. 8 shows how round-trip time 36 can be estimated by the secure device. In embodiments, the challenge 33 may be communicated in band or out of band. During a fixed delay 35, the key device may compute its cryptographic response 34.

The challenge 33 and response 34 undergo propagation delay proportional to the path distance between the key device and secure device. The secure device may estimate this path distance by subtracting the known fixed delay 35 from the measured round-trip time 36.

In embodiments, processing gain may be used to tune sensitivity, wherein the probability of an attacker obtaining a significant number of correct bits is determined and wherein the repeat challenge/response procedure is repeated enough times to reduce this probability to an acceptable level.

Traditional processing gain uses a fixed sequence or waveform for each symbol—effectively lengthening the duration of each symbol. This is commonly used to improve sensitivity and immunity to interference in low signal to noise ratio (SNR) communications.

Although the information conveyed can be cryptographically encoded, secure device authentication using such techniques may be vulnerable to relay attacks from a distance. Since the sequence or waveform for each symbol is known in advance, an attacker may predict most of a symbol after receiving a small portion of it. This allows the attacker to reproduce the symbols while removing propagation delay from the distant key device by concentrating the symbol energy in the latter portion of the symbol transmission time.

In embodiments, secure device authentication can be protected against relay attacks, while still achieving processing gain, by utilising cryptographic processing gain. Such processing gain differs from traditional processing gain by cryptographically generating the sequence used to lengthen each symbol. This ensures that no part of a symbol may be used by a relay attacker to predict a later portion of the same, or any other, symbol.

As such, if distance bounding can be achieved by ensuring tight timing synchronisation, but only with a small SNR, then cryptographic processing gain provides the ability to increase the signal strength arbitrarily without sacrificing the timing guarantees.

In embodiments, in-band timing may be measured cryptographically.

For example, pseudorandom polarity pulses may be sent, and equivalent time sampling could be used to find a fixed location on the waveform.

In embodiments, the fixed location on the waveform could be the start of the waveform, or the peak.

It should be noted that relay attack time may be affected by propagation delay caused by larger distance transmission which may give a guaranteed distance limit to any relay attacks. At short distance, receiver delay may increase exponentially with sensitivity.

In embodiments, the pads/plates on the key device could double as inductive coils for traditional NFC use, or for power delivery wherein, for example, a planar coil could be used as one pad.

Alternatively, capacitive power transfer could be used.

In embodiments, power may be stored in the device.

In embodiments, power could be harvested from the environment, for example through solar, vibration or RF energy.

Alternatively, power could be transferred using direct electrical contact.

In embodiments, a bridge device could forward information between magnetic and electrostatic domains (allowing legacy RFID cards to grant touch authentication access)

In embodiments, the two capacitive plates could comprise the two sides of a thin, credit card sized device. This device could be used to authenticate payment, increasing the difficulty of achieving successful relay attacks over conventional contactless payment systems.

Toy Weapon Scoring Application

In further embodiments, the detection circuit 1 has applications for toy weaponry scoring.

The toy weaponry system could consist of a weapon and projectile set, in which the weapon fires the projectiles (foam bullets or disks or the like).

The handle of the weapon could be one pad and another pad could be located on another part of the weapon Furthermore, the projectile could comprise two other pads. Polarity and signal strength between pads could be detected to determine proximity/contact of the projectile.

In embodiment, the circuit could be configured to only transmit or receive when the projectile stops spinning or bullet decelerates.

Combat Suit

In further embodiment, the detection circuit 1 has applications for combat suits, which are similar to the fencing application. For the combat suit, however, the body may be divided into more pads to allow the circuit to distinguish between hits to different regions on the body. Ideally, a material which provides a strong capacitive path (but not necessarily DC conductive) should be used for the weapon/pads.

In embodiments, this suit could comprise of two pads only, one in the grip of the weapon and one in the blade, similar to the embodiment outlined above for the fencing application. This would allow hit detection and scoring without any additional equipment.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilise the invention and various embodiments with various modifications as are suited to the particular use contemplated. It is intended that the following claims and their equivalents define the scope of the invention.

The invention claimed is:

1. A method for touch detection comprising employing a circuit comprising:
 a first device having a first pair of unconnected plates and an edge source coupled therebetween;
 a second device having a second pair of respective unconnected plates and a charge sensor coupled therebetween wherein the first device and the second device are provided without sharing a common ground, the method comprising:
 applying at least one differential edge between the first pair of unconnected plates using the edge source; and
 coherently sensing an imbalance in a near field channel formed between the first pair of plates using an output signal of the charge sensor to detect touch, wherein the edge source provides a current pulse transmitted through the near field channel.

2. A method as claimed in claim 1, wherein the method further comprises encoding information in the at least one differential edge and decoding the information using from the output signal of the charge sensor.

3. A method as claimed in claim 2, wherein processing gain is used for the encoding and decoding.

4. A method as claimed in claim 1, wherein the first device is a low impedance transmitter.

5. A method as claimed in claim 1, wherein the edge source is controlled to transmit a sequence of differential edges.

6. A method as claimed in 1, wherein the charge sensor has a low input impedance.

7. A method as claimed in claim 6, wherein the charge sensor comprises a transimpedance amplifier.

8. A method as claimed in claim 7, wherein the charge sensor comprises a regulated cascode transimpedance amplifier.

9. A method as claimed in claim 6, wherein the charge sensor comprises a resettable charge amplifier configured to integrate charge over a duration of a current pulse.

10. A method as claimed in claim 1, wherein the output of the charge sensor is operably coupled to an analogue-to-digital converter.

11. A method as claimed in claim 10, wherein the output of the charge sensor is sampled according to a transmission period of the at least one differential edge.

12. A method as claimed in claim 1, further comprising transmitting timing information out-of-band and controlling sampling of the second device according to the timing information.

13. A method as claimed in claim 1, wherein the second device is configured to determine when to sample the output signal according to a signal characteristic of the output signal.

14. A method as claimed in claim 1, further comprising measuring a current path direction between the second pair of plates to determine which plate of the second device is more strongly coupled to a plate of the first device.

15. A method as claimed in claim 1, wherein the circuit further comprises:
 a further edge source coupled between the second pair of plates; and
 a further charge sensor coupled between the first pair of plates, the method comprising:
 applying at least one further differential edge between the second pair of unconnected plates using the further edge source and
 detecting touch by coherently detecting an imbalance in the near field channel formed between the plates using a further output signal of the further charge sensor.

16. A method as claimed in claim 15, further comprising applying the at least one differential edge and the at least one further differential edge alternately.

17. A method as claimed in claim 16, further comprising controlling the devices to time division multiplex the at least one differential edge and the at least one further differential edge.

18. A method as claimed in claim 1, wherein the first device has a further pair of unconnected plates and wherein the method comprises applying at least one differential edge alternately between the first pair and the further pair.

19. A method as claimed in claim 1, wherein the second device has a further pair of unconnected plates and wherein the method comprises receiving the output signal alternately from the second pair and the further pair.

20. A method as claimed in claim 1, wherein the plates provide a shield between non-respective plates of the first and second pairs to are shaped to shield parasitic capacitance between non-respective plates of the first and second pairs.

21. A method as claimed in claim 1, wherein the circuit is used for touch detection for fencing.

22. A method as claimed in claim 21, wherein the circuit is placed close to a player body, and wherein plates comprise a weapon, a weapon tip, a lame, and a local pad, the local pad coupling to a player body.

23. A method as claimed in claim 22 wherein an additional pad is used for coupling a surrounding environment.

24. A method as claimed in claim 21, wherein a player body is coupled to a weapon grip and wherein plates comprise a weapon, a grip and a weapon tip.

25. A method as claimed in claim 24, wherein the circuit is housed within a guard of a weapon.

26. A method as claimed in claim 21, wherein a signal is transmitted via a piste for floor hit detection.

27. A method as claimed in claim 1, wherein the circuit is further used for secure device authentication.

28. A method as claimed in claim 27, further comprising using the first device as a key device and the second device as a secure device and wherein:
 one of the plates of the key device is located closer to a body of a user; and
 one of the plates of the secure device is located for touching by the body of the user for authorising the key device and another of the plates of the secure device couples another of the plates of the key device via a field path.

29. A method as claimed in claim 28, wherein both of the key and secure devices comprise edge sources for transmitting and charge sensors for receiving and wherein the method further comprises alternating the devices in turn between transmitting and receiving.

30. A method as claimed in claim 28, further comprising measuring a round trip transmission propagation delay between the key and secure devices.

31. A method as claimed in claim 28, further comprising authentication by transmitting a cryptographic challenge between the key and secure devices and receiving a response between the key and secure devices.

32. A method as claimed in claim 31, further comprising shortening symbol time for distance bounding.

33. A method as claimed in claim 32, further comprising using cryptographic processing gain for at least one of secure sensitivity improvement and secure noise immunity.

34. A method as claimed in claim 28, wherein the method further comprises capacitive sensing to determine which plate of the key device plates is closest to a user's body to determine orientation of the key device.

35. A method as claimed in claim 34, further comprising verifying direction of a dominant field path with respect to the orientation for preventing unauthorised access by proximal bodies.

* * * * *